(No Model.)
A. A. BETTY.
SULKY PLOW.
No. 322,243. Patented July 14, 1885.
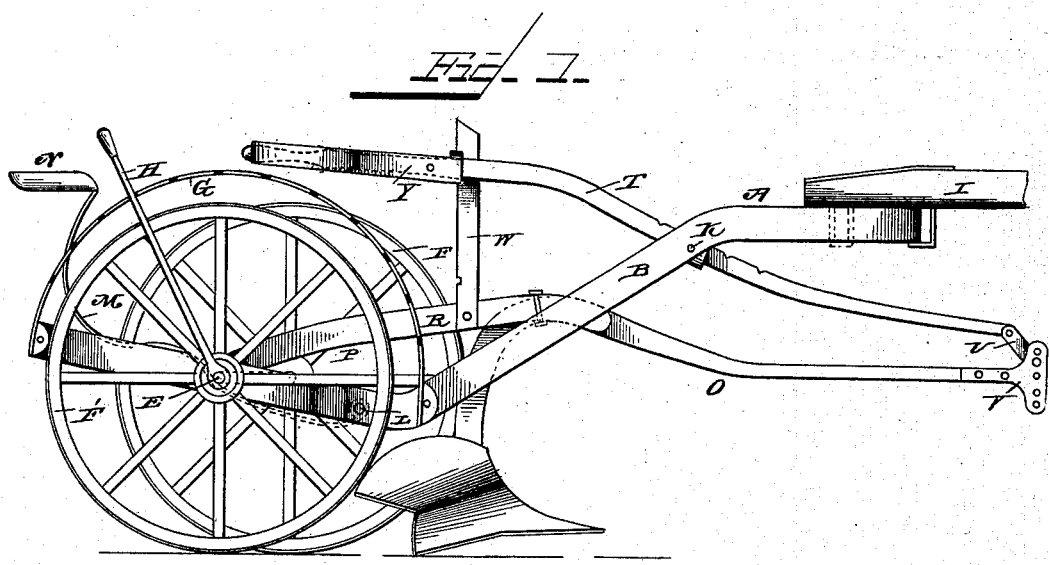
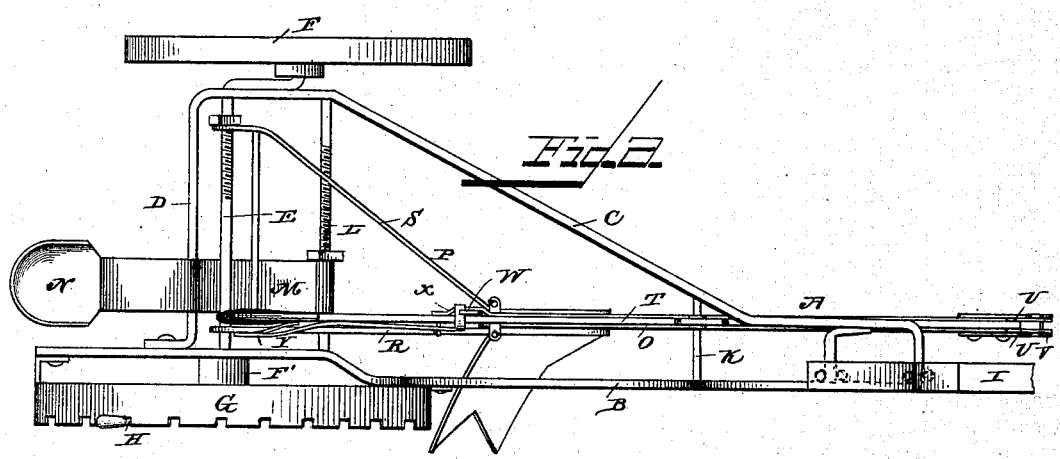
WITNESSES
INVENTOR
A. A. Betty.
By C. A. Brown & Co.
Attorneys

UNITED STATES PATENT OFFICE.

ALONZO A. BETTY, OF BUTLER, ILLINOIS.

SULKY-PLOW.

SPECIFICATION forming part of Letters Patent No. 322,243, dated July 14, 1885.

Application filed May 13, 1885. (No model.)

*To all whom it may concern:*

Be it known that I, ALONZO A. BETTY, a citizen of the United States, residing at Butler, in the county of Montgomery and State of Illinois, have invented a new and useful Improvement in Sulky-Plows, of which the following is a specification, reference being had to the accompanying drawings.

My invention relates to an improvement in sulky-plows; and it consists in the peculiar construction and combination of devices that will be more fully set forth hereinafter, and particularly pointed out in the claims.

In the accompanying drawings, Figure 1 is a side elevation of a sulky-plow embodying my invention. Fig. 2 is a top plan view of the same.

A represents a frame, which consists of the straight side B, the diagonal side C, and the rear transverse connecting-bar, D. This frame is preferably made of metal bars bent into the shape shown. The side B extends rearwardly for some distance behind the bar D. This frame is fulcrumed on a bent axle, E, to which are journaled the supporting-wheels F F'. A segmental rack, G, is secured to the side B of the frame, and is bent over the upper side of the wheel F', and to one projecting end of the bent axle is fixed a hand-lever, H, that engages with the segmental rack, as shown.

To the front end of the frame is secured a tongue, I, and through said frame extend transverse bars or rods, one, K, being near the front end of the frame, and the other, L, being near the rear end thereof.

On the rod L is secured one end of a flat bent spring, M, which extends rearwardly under the axle and then over the top of the bar D, on which it bears, and to the upper rearwardly-bent end of the spring is bolted a driver's seat, N. The spring, and with it the seat, may be moved laterally with respect to the frame, as will be very readily understood.

O represents a plow-beam, to which, on opposite sides thereof, is bolted a frame, P, which extends rearwardly therefrom. This frame consists of the straight bar R and the oblique bar S, the rear ends of which bars are fulcrumed on the axle.

On the rod K of the frame A is fulcrumed a lever, T, the rear end of which extends to within easy reach of the driver on the seat, and the front end of which is connected to the front end of the plow-beam by links U. A clevis, V, is provided for the front end of the plow-beam to which to hitch the team.

To the bar R is pivoted a vertically-extending rack, W, which passes up through a keeper, X, with which the lever T is provided. A spring-actuated bolt, Y, is provided for the lever T, and serves to engage with the rack W and secure the free end of the lever T thereto at any desired height.

By having the plow provided with a rearwardly-extending frame that is fulcrumed on the axle, and by means of the fulcrumed lever T, that is attached to the front end of the plow-beam, the plow may be easily raised or lowered by the driver on the seat, as will be very readily understood.

By means of the hand-lever H, that is secured to the axle, the plow may be caused to run evenly at any desired depth in the ground.

The frame P is adapted to be adjusted laterally on the bent axle, by which means the wheel F' may be caused to run in rear of and in the furrow made by the plow; or the plow may be moved out of line with said wheel, as preferred, or as the necessity of the case may require.

The front portion of the frame A, to which the tongue is bolted, is sufficiently wide to admit of lateral adjustment of the tongue thereon, so that the plow is adapted for the attachment of either a two-horse or a three-horse team.

A sulky-plow thus constructed is strong, light, and cheap, is easily managed, and runs smoothly in the ground.

Having thus described my invention, I claim—

1. The combination, in a sulky-plow, of the frame A, the plow-frame P, fulcrumed on the axle and laterally adjustable thereon, and the laterally-movable lever T, fulcrumed to the frame A and connected to the plow-frame, substantially as described.

2. The combination, in a sulky-plow, of the frame A and plow-frame fulcrumed on the axle, the plow-frame being laterally adjustable thereon, the laterally-movable lever T, fulcrumed to the frame A and connected to the plow-frame, and the tongue secured to and laterally adjustable on the frame A, substantially as described.

3. The combination, in a sulky-plow, of the frame A, the plow-frame fulcrumed on the axle and laterally adjustable thereon, the laterally-movable lever T, fulcrumed to the frame A and connected to the plow-frame, the tongue secured to and laterally adjustable on the frame A, and the laterally-adjustable seat, whereby the plow, the tongue, and the seat may be kept in line with each other at any desired adjustment, substantially as described.

In testimony that I claim the foregoing as my own I have hereto affixed my signature in presence of two witnesses.

ALONZO A. BETTY.

Witnesses:
CHARLES H. BETTY,
CHAS. O. BROWN.